Oct. 1, 1957  M. F. PETERS  2,808,450
ELECTRIC CABLES AND THE METHOD OF MAKING THE SAME
Filed Nov. 22, 1950
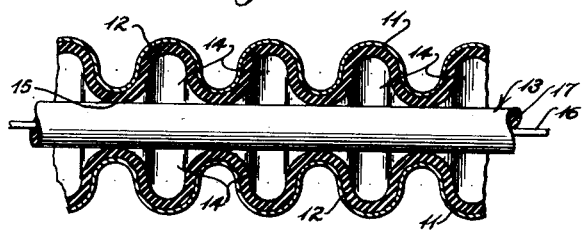
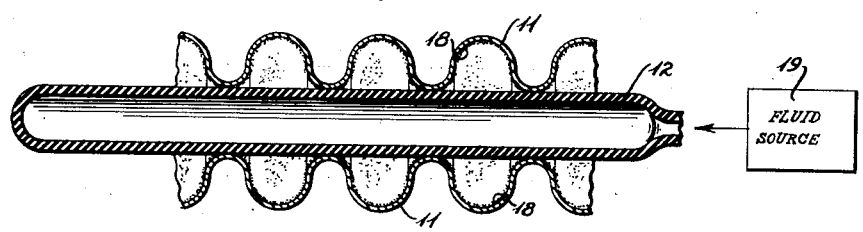
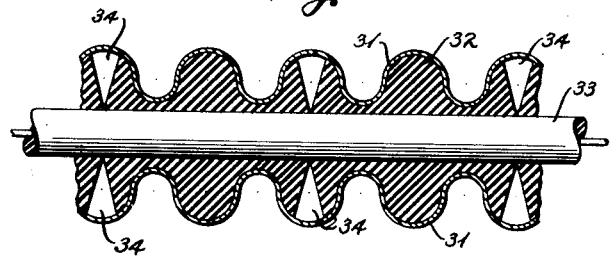
Inventor
Melville F. Peters

United States Patent Office 2,808,450
Patented Oct. 1, 1957

2,808,450

ELECTRIC CABLES AND THE METHOD OF MAKING THE SAME

Melville F. Peters, East Orange, N. J.

Application November 22, 1950, Serial No. 197,060

4 Claims. (Cl. 174—102)

The present invention relates to electric cables and the method of making the same, and more particularly to electric cables of the type where the voids between the inner conductor and the outer protective shield are filled with insulating material.

It is well known that there are many advantages in filling the voids between the inner conductor, usually insulated, and the outer protective shield of an electric cable, particularly where the cable is used for the high tension lead of an aircraft engine. When such cables are used as leads whose movements are relatively slow, the principal advantages of filling the voids are reduction of corona and reduction of water condensation. When such cables are subjected to vibration, additional advantages are presented, namely, prevention of chafing between the conductor and the shield and damping of stress waves in the shield. This latter effect is of particular importance where metal shields are employed, especially flexible metal shields.

For many types of dielectric or insulating material, the expansion thereof over the usable temperature range is not great enough to cause failure of the cable. However, with certain materials, such as silicon which has a useful temperature range of from —60° to 500° F., the increase in volume over this range is sufficient to cause the material to extrude from the ends of the cable or to burst the shield.

The present invention proposes to overcome these disadvantages of the prior art by filling the voids in such manner so that at temperatures below the maximum of the usable range, voids exist between the insulating material and the conductor, these voids being filled by the expanded insulated material at the elevated temperatures. These voids may be produced, according to the present invention, by forcing the material between the shield and the conductor at the maximum temperature to form a sheath, thus permitting the voids to be produced when the cable is operated at lower temperatures. The voids may also be produced by assembling the cable at room temperature in a manner to be described below.

Accordingly, it is an object of the present invention to provide an electric cable whose operation is unaffected at elevated temperatures.

Another object is the provision of an electric cable filled with insulating material in the form of a sheath the expansion of which at elevated temperatures does not adversely affect the operation of the cable.

A further object of the present invention is to provide an electric cable having voids therein between the inner conductor and the insulating material, whereby expansion of the material at elevated temperatures does not damage the cable.

Still another object is to provide a method of making a filled electric cable which is not damaged by operation at elevated temperatures.

A still further object of the present invention is the provision of a method of making a filled electric cable so that at temperatures below the maximum usable temperature voids exist therein, the voids being filled by expansion of the filling material when the cable is operated at its maximum useful temperature.

The exact nature of the present invention as well as other objects and advantages thereof will be readily apparent from consideration of the following detailed description related to the annexed drawing in which:

Fig. 1 is a longitudinal sectional view of one embodiment of the cable according to the present invention;

Fig. 2 is a view similar to Fig. 1 of the cable of Fig. 1 prior to the molding of the insulating material; and Fig. 3 is a view similar to Fig. 1 of another embodiment of the invention.

Referring now to the drawings, wherein like reference characters designate like or corresponding parts throughout the several views, there is shown in Fig. 1 an assembled electric cable according to the present invention, the components of the cable being shown in their relative positions at or about the minimum temperature of the useful temperature range. The cable of the present invention comprises a flexible metal shield or tube 11 of sylphonic form and an insulating or dielectric material 12, preferably completely covering the inner surface of tube 11.

The inner conductor 13 which may be insulated or uninsulated is drawn longitudinally through tube 11 and material 12 so that conductor 13 rests snugly against the portions 15 of material 12, there being voids 14 between conductor 13 and material 12, as shown in Fig. 1. It is understood, of course, that both the convolutions of tube 11 and the voids 14 are shown in exaggerated form for the purpose of clarity.

In operation, as the temperature of the cable is raised, material 12 expands at a greater rate than tube 11, but the excess material is now permitted to fill the voids 14 thereby preventing excess stress on tube 11. Similarly, if, as in Fig. 1, inner conductor 13 comprises a single conducting element 16 surrounded by an insulating cover 17, cover 17 is free to expand into the voids 14.

Although conductor 13 has been illustrated in Fig. 1 as comprising a single conducting element 16, it is apparent that the present invention is equally applicable to conductors containing a plurality of conducting elements surrounded by an insulating cover. In addition, the present invention is equally applicable to other types of cables, that is cables of the coaxial type or of the multiconductor type. It is therefore to be understood that the single conductor illustrated in Fig. 1 is merely illustrative and is not intended to limit the scope of the present invention.

One method of inserting the material 12 is illustrated in Fig. 2, wherein fluid pressure is utilized to produce the close association between material 12 and tube 11. Referring now to Fig. 2, the inner surface of tube 11 is initially cleaned and then coated with a suitable adhesive 18. A tube of material 12 is inserted into tube 11, as shown in Fig. 2, one end of the material being closed by initially forming it in this shape, or by the insertion of a plug therein. Fluid pressure, such as air or steam, is then introduced into the other end of the tube of material 12 from a fluid pressure source 19, the application of the pressure continuing until material 12 is forced into the convolutions of tube 11 thereby producing the combined structure indicated in Fig. 1.

After material 12 has been forced into the convolutions of tube 11, it is cured by heating to the proper temperature, depending upon the material used. It is to be understood, of course, that material 12 may be cured, either completely or partially, prior to being forced into the convolutions of tube 11, in this way at least partially avoiding the heating of tube 11. It is to be understood further that the tube of material 12 may be formed in any suitable manner, and that the formation thereof forms no part of the present invention.

In some instances, it may be desirable to evacuate tube 11 prior to the introduction of the fluid in order to insure close and even adherence between tube 11 and material 12. The material 12 should be of such type so as not to be subject to unfavorable physical or chemical reaction with the fluid medium. Material 12 may be a single substance, such as neoprene, silicon or "Teflon," or it may be composed of a plurality of substances, such as glass impregnated with a suitable dielectric.

After material 12 has become firmly fixed to tube 11 and has been cooled, conductor 13 may be inserted therein to form the complete cable, as shown in Fig. 1.

Another method of making the cable according to the present invention would be to force material 12 between tube 11 and conductor 13 while all of the elements are held at an elevated temperature, preferably the maximum usable temperature. Subsequent cooling of the cable will produce voids between material 12 and conductor 13, these voids being of sufficient volume to accommodate any future expansion of either material 12 or conductor 13. In this method, a suitable adherent will be applied to the inner surface of tube 11 prior to the insertion of material 12.

Referring now to Fig. 3, there is illustrated a modified arrangement of the cable of Fig. 1. In this embodiment of the present invention, the dielectric or insulating material 32 completely fills the space between the flexible shield or tube 31 and conductor 33, except for a plurality of voids 34 at spaced points within material 32. Voids 34 are spaced at such intervals and are of such volume that the expansion of material 32 therebetween will be completely accommodated thereby, and that the combined pressure of expanded material 32 and of the air within voids 34 will not cause a bursting of tube 31 or a longitudinal flow of material 32 out through the ends of the cable. If the cable is short, two voids, one at each end, may prove sufficient. Voids 34 are shown as V-shaped in Fig. 3, in order to prevent excessive electrical gradients.

The voids 34 of Fig. 3 may be formed by initially molding material 32 into the shape disclosed in Fig. 3, and then inserting conductor 33 therethrough and wrapping tube 31 therearound. These steps may be performed at room temperature or at the minimum usable temperature, it being clear that the volume of voids 34 will differ depending upon which temperature is used and upon the expansion characteristics of material 32.

Voids 34 may also be formed by extruding material 32 into the space between tube 31 and conductor 33, there being a plurality of removable plugs inserted into this space at the points where voids 34 are to be produced. The plugs could be made removable by making them deflatable, and removing them after material 32 has adhered to tube 31 by first removing conductor 33.

Although each of the embodiments thus far disclosed have been described as applying to a flexible tube or shield having convolutions, it is clear that the present invention is equally applicable to other types of shields, such as rigid tubes or flexible non-convoluted tubes. It is therefore to be understood that the term tube or shield in the claims is not limited to a convoluted type unless so specifically defined. Similarly, the term conductor in the claims is not limited to a single conducting element but may include a plurality thereof.

After the cable is prepared, it may be desirable to mold terminals at the ends thereof, as for example the standard terminals of a spark plug high tension lead. In this manner the inner conductor may be held in place even though this conductor is not firmly held by the insulating or dielectric.

From the above description, it is apparent that the present invention provides a filled electric cable, and the method of making the same, which is not adversely affected by operation at elevated temperatures. This result is attained by the provision of voids between the inner conductor and the insulating material, these voids being of sufficient volume to accommodate the expansion of the insulating material and the conductor when the cable is operated at elevated temperatures.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. An electric cable comprising a conductor, a flexible protective metallic shield of sylphonic form spaced from and surrounding said conductor, and an insulating material secured to said shield and contacting at least a portion of said conductor, said material having usable dielectric properties over a wide range of temperatures but being subject to volumetric expansion throughout said temperature range sufficient to cause destruction or malfunction of said cable, said insulating material being arranged and formed to provide voids between said shield and said conductor whereby malfunction or destruction of said cable because of said expansion of said material is prevented.

2. A cable according to claim 1 in which said insulating material covers the entire inner surface of said shield.

3. A cable according to claim 1, wherein said voids are V-shaped in cross-section.

4. A cable according to claim 3, wherein the apex of the V is adjacent said conductor.

References Cited in the file of this patent

UNITED STATES PATENTS

| | | |
|---|---|---|
| 746,630 | Greenfield | Dec. 8, 1903 |
| 1,659,371 | Merrill | Feb. 14, 1928 |
| 1,977,325 | Pfannkuch | Oct. 16, 1934 |
| 2,052,923 | Dunsheath | Sept. 1, 1936 |
| 2,099,407 | Mildner | Nov. 16, 1937 |
| 2,304,210 | Scott et al. | Dec. 8, 1942 |
| 2,442,623 | Sziklai | June 1, 1948 |
| 2,488,211 | Lemon | Nov. 15, 1949 |

FOREIGN PATENTS

| | | |
|---|---|---|
| 358,373 | Great Britain | Oct. 8, 1931 |
| 764,175 | France | Feb. 26, 1934 |
| 693,093 | Germany | July 2, 1940 |
| 71,406 | Norway | Dec. 23, 1946 |
| 257,225 | Switzerland | Jan. 13, 1947 |
| 618,649 | Great Britain | Feb. 24, 1949 |